United States Patent Office 3,334,118
Patented Aug. 1, 1967

3,334,118
PROCESS FOR OBTAINING PURIFIED
CRYSTALLINE VITAMIN $D_3$
Kurt H. Schaaf, Morris Plains, N.J., Seymour Schmukler, Dalton, Mass., and Howard C. Klein, Brooklyn, N.Y., assignors to Nopco Chemical Company, Newark, N.J., a corporation of New Jersey
No Drawing. Filed July 28, 1965, Ser. No. 475,560
5 Claims. (Cl. 260—397.25)

This invention relates to a method for obtaining purified crystalline vitamin $D_3$.

Vitamin $D_3$ is prepared by irradiation of a solution of its provitamin (7-dehydrocholestrol). The irradiation product is a mixture of vitamin $D_3$, unconverted provitamin, as well as other products. Since vitamin $D_3$ does not readily crystallize from the irradiation product, the mixture is treated to separate the provitamin and other impurities from vitamin $D_3$. One of the steps in the purification involves esterification of the mixture to obtain vitamin $D_3$ esters which crystallize readily from the mixture. Organic acids such as propionic acid, butyric acid, isobutyric acid, valeric acid, isovaleric acid and the like or suitable derivatives thereof, such as their corresponding acid halides or anhydrides, are employed in this esterification. Once a crystalline ester of vitamin $D_3$ is obtained, it can be further purified by crystallization from a suitable solvent. The purified vitamin $D_3$ ester is then saponified under alkaline conditions to obtain vitamin $D_3$. A solution of an alkali in an alcohol such as potassium hydroxide in methyl alcohol is usually employed in the saponification. The ester or a solution of the ester is added to the alcoholic alkali solution or the alcoholic alkali solution is added to a solution of the ester. Saponification is preferably carried out at temperatures between 0° C. and 80° C.

Vitamin $D_3$ can be isolated from the saponification mixture by a variety of methods. For example, the saponification mixture can be inoculated or seeded with vitamin $D_3$ crystals whereupon the vitamin $D_3$ separates from the mixture in the form of a gum which is known as vitamin $D_3$ resin. Another method is to add water to the saponification mixture after hydrolysis and then extract the resulting aqueous mixture with a water immiscible organic solvent such as an ether or a petroleum ether. This extract is then washed in sequence with a dilute solution of an inorganic acid such as sulfuric acid or hydrochloric acid, water, a dilute aqueous alkaline solution such as a dilute solution of sodium bicarbonate and then with water. The resulting extract is then dried with a solid desiccant such as anhydrous sodium sulfate. The dried extract is then concentrated to obtain the vitamin $D_3$ resin.

Vitamin $D_3$ resins obtained by these various methods require further purification. They are usually purified by crystallization from solvents or solvents mixtures. Vitamin $D_3$ is very soluble in benzene but cannot be satisfactorily crystallized from benzene solutions because of its high solubility. Likewise vitamin $D_3$ does not crystallize readily from alcohols because of its high solubility. The usual procedures are to use acetone or acetone water mixtures for crystallization of vitamin $D_3$. Unless the vitamin $D_3$ resin is of exceptionally high purity, vitamin $D_3$ crystallization takes place very slowly, if at all, and days may be required for crystallization of vitamin $D_3$ from the solvent mixture.

When crystallization of vitamin $D_3$ resin from the saponification mixture is attempted with acetone water solvent mixtures, gel formation is often encountered and crystallization requires days. Similar difficulties are frequently experienced in the crystallization of vitamin $D_3$ crystals from acetone water mixtures.

It is an object of the present invention to provide an improved process for the prepartion of purified crystalline vitamin $D_3$. Another object of this invention is to provide a process in which high yields of high purity crystaline vitamin $D_3$ are obtained by crystallization of vitamin $D_3$ from saponification mixtures directly. A further object is to provide a process for the purification of vitamin $D_3$ resins to obtain high purity crystalline vitamin $D_3$. Further objects will become apparent from the detailed description given hereinafter. It is intended however that the detailed description and specific examples do not limit this invention, but merely indicate the preferred embodiments since various changes and modifications within the scope of the invention will become apparent to those skilled in the art.

The objects of this invention have been unexpectedly accomplished in the following manner. Purified aliphatic nitriles having from two to five carbon atoms are added to a solution of vitamin $D_3$ or vitamin $D_3$ resin in a solvent such as aliphatic hydrocarbons, cycloaliphatic hydrocarbons, aromatic hydrocarbons, aliphatic alcohols, aliphatic ketones and their mixtures. Thereafter crystallization of vitamin $D_3$ from the solution is initiated and crystallization allowed to proceed after which crystalline vitamin $D_3$ is recovered.

Generally a solution containing one part by weight of vitamin $D_3$ or vitamin $D_3$ resin in from one to four parts by volume of a solvent such as aliphatic hydrocarbons, cycloaliphatic hydrocarbons, aromatic hydrocarbons, aliphatic alcohols, aliphatic ketones or their mixtures is employed. If desired, the solution may be the saponification mixture which is obtained when one of the above-mentioned vitamin $D_3$ esters is saponified in an alcoholic alkali solution to obtain an alcoholic solution of vitamin $D_3$ or vitamin $D_3$ resin and contains free alkali and alkali salts of organic acids as impurities. From three to twelve parts by volume of an aliphatic nitrile having from two to five carbon atoms is then added to the solution of vitamin $D_3$ or vitamin $D_3$ resin. Crystallization of vitamin $D_3$ is initiated and allowed to proceed. Crystalline vitamin $D_3$ is separated from the solution and washed with aqueous nitrile solution to remove free alkali and alkali salts of organic acids present in the vitamin $D_3$ as impurities. Vitamin $D_3$ crystals prepared by this process have high purities and do not require further purification such as recrystallization.

As examples of solvents which can be employed in the preparation of vitamin $D_3$ or vitamin $D_3$ resin solutions, there may be mentioned aliphatic hydrocarbons, such as pentane, hexane, heptane, V.M.P. naphtha and their mixtures; cycloaliphatic hydrocarbons, such as cyclopentane or cyclohexane and their mixtures; aromatic hydrocarbons such as benzene, toluene, xylene, their isomers and their mixtures; aliphatic alcohols such as methyl alcohol, ethyl alcohol, n-propyl alcohol, isopropyl alcohol, n-butyl alcohol, sec-butyl alcohol, isobutyl alcohol, tert-butyl alcohol, amyl alcohol, sec-n-amyl alcohol, prim-isoamyl alcohol, sec-isoamyl alcohol, tert-amyl alcohol, n-amyl alcohol, their isomers and their mixtures; and aliphatic ketones such as acetone, methyl ethyl ketone, diethyl ketone, dipropyl ketone, methyl isobutyl ketone, diisobutyl ketone, their isomers and their mixtures. Solvents having boiling points below 150° C. at 760 mm. are usually preferred.

As examples of aliphatic nitriles having from two to five carbon atoms which can be employed in the practice of this invention, there may be mentioned acetonitrile, propionitrile, butyronitrile, isobutyronitrile, valeronitrile, isovaleronitrile, their isomers and their mixtures. Nitriles having boiling points below 150° C. at 760 mm. are usually preferred.

By initiating crystallization of vitamin $D_3$, we mean any procedure which will cause vitamin $D_3$ crystal formation in any solution of vitamin $D_3$ or vitamin $D_3$ resin in the above-mentioned solvents and nitriles. Such crystallization procedures include agitating these solutions, storing such solutions at room temperature or below room temperature, cooling such agitated solutions, inoculating or seeding these solutions with crystalline vitamin $D_3$, applying mechanical, physical or other forms of shock to such solutions to induce crystallization or combinations of these prodcedures as well as use of conventional procedures which induce crystallization. Crystalline vitamin $D_3$ is usually recovered from these solutions by filtration or other conventional means of separation. The process disclosed in this invention gives crystalline vitamin $D_3$ in high purity and in excellent yields. The process disclosed in this invention has the further advantage that use of nitrogen or other inert gases is not necessary and the crystallization of vitamin $D_3$ can be carried out in the presence of air.

For a fuller understanding of the nature and objects of this invention reference may be made to the following examples which are given merely to illustrate the invention and are not to be construed in a limiting sense.

*Example I*

2.20 g. of crystalline vitamin $D_3$ (95.4% pure;

$$E_{1\,cm.}^{1\%} = 457 \text{ at } 265 \text{ m}\mu$$

in isopropyl alcohol) was dissolved in 8.8 ml. of purified benzene in an atmosphere of nitrogen. 17.6 ml. of purified acetonitrile was added to the benzene solution. The resulting solution was then seeded with vitamin $D_3$ crystals and cooled for three hours at $-15°$ C. Crystalline vitamin $D_3$ separated from the solution during cooling and was removed by filtration at $-15°$ C. The vitamin $D_3$ crystals were washed with two 4.2 ml. portions of purified acetonitrile which had been cooled to $-15°$ C. The crystals were then vacuum dried at room temperature to obtain 1.52 g. of white crystalline vitamin $D_3$ ($E_{1\,cm.}^{1\%} = 470$ at 265 m$\mu$ in isopropyl alcohol).

*Example II*

A solution containing 15.3 ml. of purified benzene and 7.7 g. of vitamin $D_3$ resin, which was obtained by saponifying 9.10 g. of vitamin $D_3$ butyrate (98.9% pure), was prepared in a nitrogen atmosphere and 31 ml. of purified acetonitrile was added. The benzene solution became cloudy immediately after addition of the acetonitrile and a small amount of brown flocculent material separated within two minutes. The solution was filtered to remove the flocculent material. The resulting filtrate was cooled at 5° C. for one hour and seeded with vitamin $D_3$ crystals. It was then cooled for forty-eight hours at 5° C. Vitamin $D_3$ crystals separated from the solution during cooling and were removed by filtration at $-15°$ C. The vitamin $D_3$ crystals were washed with two 16 ml. portions of purified acetonitrile which had been cooled to $-15°$ C. and were then vacuum dried at room temperature to obtain 5.71 g. of crystalline vitamin $D_3$ (100% pure;

$$E_{1\,cm.}^{1\%} = 483 \text{ at } 265 \text{ m}\mu$$

in isopropyl alcohol).

*Example III*

A solution of 2.00 g. of vitamin $D_3$ resin (95.5% pure) in 8 ml. of purified acetone was prepared in an atmosphere of nitrogen and 8 ml. of purified acetonitrile added. The resulting solution was cooled to 5° C. and stored for forty-eight hours at 5° C. Crystalline vitamin $D_3$ separated from the solution during storage at 5° C. and was removed by filtration at $-5°$ C. The vitamin $D_3$ crystals were washed with two 4 ml. portions of purified acetonitrile which had been cooled to $-5°$ C. and were then vacuum dried at room temperature to obtain 1.77 g. of crystalline vitamin $D_3$ (100% pure;

$$E_{1\,cm.}^{1\%} = 500 \text{ at } 265 \text{ m}\mu$$

in isopropyl alcohol). The vitamin $D_3$ crystals represented a recovery of 92.6% of the vitamin $D_3$ input.

*Example IV*

34.7 g. of vitamin $D_3$ resin which had been obtained from the saponification of 40.0 g. of vitamin $D_3$ butyrate (97.5% pure) was dissolved in 140 ml. of purified acetone in an atmosphere of nitrogen. A total of 140 ml. of purified acetonitrile was added to the acetone solution and the resulting solution was seeded with vitamin $D_3$ crystals. This solution was then stored at 0° to $-5°$ C. for two hours in a nitrogen atmosphere and at $-15°$ to $-20°$ C. for another two hours in the nitrogen atmosphere. Crystalline vitamin $D_3$ separated during storage and was removed by filtration at $-15°$ C. The vitamin $D_3$ crystals were then washed with two 70 ml. portions of purified acetonitrile which had been cooled to $-15°$ C. The vitamin $D_3$ crystals were vacuum dried at room temperature to obtain 29.4 g. of vitamin $D_3$ (100% pure;

$$E_{1\,cm.}^{1\%} = 492.9 \text{ at } 265 \text{ m}\mu$$

in isopropyl alcohol). These vitamin $D_3$ crystals represented an 89.4% recovery of the vitamin $D_3$ input.

*Example V*

7.68 g. of vitamin $D_3$ resin which had been obtained from the saponification of 9.10 g. of vitamin $D_3$ butyrate (100% pure) was dissolved in 15.4 ml. of purified benzene in a nitrogen atmosphere. 31 ml. of purified acetonitrile was added to the benzene solution. A small amount of brown flocculent material separated from the benzene solution within one minute after addition of the acetonitrile. The flocculent material was removed by filtration to obtain a colorless filtrate. The resulting filtrate was seeded with vitamin $D_3$ crystals, stored for twelve hours at 5° C. and then for twenty-four hours at $-15°$ C. Vitamin $D_3$ crystals separated from the filtrate during storage and were removed by filtration at $-15°$ C. The vitamin $D_3$ crystals were washed with two 16 ml. portions of acetonitrile which had been cooled to $-15°$ C. and were vacuum dried at room temperature to obtain 5.7 g. of crystalline vitamin $D_3$ (100% pure;

$$E_{1\,cm.}^{1\%} = 487 \text{ at } 265 \text{ m}\mu$$

in isopropyl alcohol; U.S.P. chemical assay: 39.7 million units/g.).

*Example VI*

A benzene solution containing 33.8 ml. of purified benzene and 16.9 g. of vitamin $D_3$ resin, which had been obtained from the saponification of 20.0 g. of vitamin $D_3$ butyrate (95.2% pure), was prepared in an atmosphere of nitrogen and 102 ml. of purified acetonitrile added. The benzene solution became cloudy immediately after addition of the acetonitrile and a small amount of brown flocculent material separated within two minutes. The solution was filtered through a bed of diatomaceous filter aid (Supercel) to remove the flocculent material. The resulting filtrate was seeded with vitamin $D_3$ crystals and cooled to 5° C. It was stored for twelve hours at 5° C. and then for twenty-four hours at $-15°$ C. Vitamin $D_3$ crystals separated from the solution during storage and were removed by filtration at $-15°$ C. The vitamin $D_3$ crystals were washed with two 18 ml. portions of purified acetonitrile which had been cooled to $-15°$ C. and were then vacuum dried at room temperature to obtain 13.41 g. of crystalline vitamin $D_3$ (100% pure;

$$E_{1\,cm.}^{1\%} = 494 \text{ at } 265 \text{ m}\mu$$

in isopropyl alcohol).

*Example VII*

9.10 g. of vitamin $D_3$ butyrate and 0.91 g. of decolorizing carbon (Darco G-60) were added to a solution of 1.30 g. of 85% potassium hydroxide in 30 ml. of methyl alcohol. The resulting mixture was stirred in a nitrogen atmosphere and refluxed for ten minutes. It was then quickly cooled to room temperature and filtered through a bed of 0.91 g. of diatomaceous filter aid (Supercel). The filter aid was washed with 7 ml. methanol and the washings added to the filtrate. The pale amber filtrate was cooled to 0° C. and seeded with vitamin $D_3$ crystals. 74 ml. of purified acetonitrile was added dropwise over a twenty-five minute period to the filtrate. A yellow white viscous oil separated during the acetonitrile addition. This oil was seeded with additional vitamin $D_3$ crystals to obtain a white crystalline suspension of vitamin $D_3$. The resulting suspension was stored for twelve hours at −10° C. and then filtered at 0° C. to remove the crystalline vitamin $D_3$. The vitamin $D_3$ crystals were washed with two 18 ml. portions of 50% aqueous acetonitrile which had been cooled to 0° C. The crystals were then washed with 7 ml. of purified acetonitrile which had been cooled to 0° C. and vacuum dried at room temperature to obtain 6.18 g. of crystalline vitamin $D_3$ $$E_{1\,cm.}^{1\%} = 463 \text{ at } 26\text{ }5m\mu$$

in isopropyl alcohol; $[\alpha]_D + 106.26°$ in 95% ethyl alcohol). The specific rotation of vitamin $D_3$ as determined by the Pharmacopeia of the U.S. 16 (1960) page 198 for a solution of alcohol containing 50 mg. of vitamin $D_3$ in each 10 ml. is not less than $+105°$ and not more than $+112°$.

Example VIII

The procedure in Example VII was repeated except that the process was carried out in the presence of air instead of in the prescence of a nitrogen atmosphere. A total of 6.95 g. of white crystalline vitamin $D_3$ $$E_{1\,cm.}^{1\%} = 463 \text{ at } 265 \text{ m}\mu$$

in isopropyl alcohol) was obtained. This example demonstrates that the presence of air does not have any adverse effects upon the process or upon the purity of the vitamin $D_3$ obtained from the process.

Example IX 9.10 g. of vitamin $D_3$ butyrate (98.8% pure) and 0.91 g. of decolorizing carbon (Darco G-60) were added to a solution of 1.39 g. of 85% potassium hydroxide in 30 ml. of methyl alcohol. This solution was heated in a nitrogen atmosphere and refluxed for ten minutes with agitation. It was then quickly cooled to room temperature and filtered through a bed of 0.91 g. of diatomaceous filter aid (Supercel). The filter aid bed was then washed with 7 ml. of methyl alcohol and the washing added to the filtrate. The light yellow filtrate was added dropwise with agitation to 111 ml. of purified acetonitrile at 0° C. in a nitrogen atmosphere. The addition required twenty-eight minutes. The mixture was seeded with vitamin $D_3$ crystals during the addition and vitamin $D_3$ crystals separated from the mixture. The crystals became gummy during the addition so the mixture was warmed to room temperature and the addition completed. The resulting mixture was then reseeded with vitamin $D_3$ crystals, agitated for ninety minutes at room temperature to complete crystallization of vitamin $D_3$ and then stored for twelve hours at −10° C. The resulting vitamin $D_3$ crystals were separated by filtration at 0° C., washed with two 18 ml. portions of 50% aqueous acetonitrile which had been cooled to 0° C. and then washed with 7 ml. of acetonitrile which had been cooled to 0° C. The vitamin $D_3$ crystals were vacuum dried at room temperature to obtain 6.06 g. of crystalline vitamin $D_3$ (100% pure;

$$E_{1\,cm.}^{1\%} = 476 \text{ at } 265 \text{ m}\mu$$

in isopropyl alcohol; $[\alpha]_D + 107.97°$).

Example X

The procedure of Example IX was repeated except that the process was carried out in the presence of air instead of in the presence of nitrogen. A total of 6.41 g. of crystalline vitamin $D_3$ $$E_{1\,cm.}^{1\%} = 474 \text{ at } 265 \text{ m}\mu$$

in isopropyl alcohol) was obtained. This example demonstrates that the presence of air did not have any adverse effects upon the process or upon the vitamin $D_3$ produced by the process.

Example XI 9.10 g. of vitamin $D_3$ butyrate (95.2% pure) was added to a solution of 2.70 g. of 85% potassium hydroxide in 18.5 ml. of methyl alcohol. This mixture was heated with agitation in a nitrogen atmosphere and refluxed for ten minutes. The resulting mixture was then quickly cooled to room temperature and was added dropwise in a nitrogen atmosphere with agitation to 55 ml. of purified acetonitrile which had been seeded with crystalline vitamin $D_3$. After the addition was complete, the mixture was cooled to −15° C. and stored for twelve hours at −15° C. The mixture was then stirred for two hours at −15° C. and filtered at −15° C. to remove the crystalline vitamin $D_3$. The vitamin $D_3$ crystals were washed with two 25 ml. portions of 50% aqueous acetonitrile which had been cooled to −15° C., then with two 15 ml. portions of chilled (−15° C.) acetonitrile and were vacuum dried at room temperature. A total of 6.59 g. of crystalline vitamin $D_3$ (100% pure;

$$E_{1\,cm.}^{\%1} = 482 \text{ at } 265 \text{ m}\mu$$

in isopropyl alcohol) or 90.2% of the theoretical yield was obtained.

Example XII

A solution of 15.4 ml. of purified benzene and 7.68 g. of vitamin $D_3$, which had been obtained by saponification of 9.10 g. of vitamin $D_3$ butyrate (96.5% pure), was prepared in an atmosphere of nitrogen and 46 ml. of purified acetonitrile added. The solution became hazy during the acetonitrile addition. The solution was then stored for forty-five minutes at room temperature and filtered. The resulting filtrate was seeded with vitamin $D_3$ crystals and stored in a nitrogen atmosphere at 5° C. After crystallization occurred, the mixture was stored for forty-eight hours at −10° C. Vitamin $D_3$ crystals were removed from the mixture by filtration at −15° C. and were washed with two 18 ml. portions of purified acetonitrile which had been cooled to −15° C. These crystals were vacuum dried at room temperature to obtain 5.66 g. of crystalline vitamin $D_3$ (100% pure;

$$E_{1\,cm.}^{1\%} = 485 \text{ at } 265 \text{ m}\mu$$

in isopropyl alcohol).

Example XIII

A solution of 15.4 ml. of purified benzene and 7.68 g. of vitamin $D_3$, which had been obtained by saponification of 9.10 g. of vitamin $D_3$ butyrate (96.5% pure), was prepared in a nitrogen atmosphere and 46.5 ml. of purified acetonitrile added. A brown flocculent material separated from the solution within a few minutes after the acetonitrile addition. An additional 7.5 ml. of purified acetonitrile was added to the solution after forty-five minutes storage at room temperature in a nitrogen atmosphere and the solution was filtered to remove the flocculent material. The resulting clear pale yellow filtrate was seeded with vitamin $D_3$ crystals and stirred at room temperature in an atmosphere of nitrogen. Crystallization of vitamin $D_3$ occurred within three minutes. The mixture was stirred for forty-five minutes at room temperature and then stored at 5° C. for twelve hours in an atmosphere of nitrogen. It was then stirred for four hours in an atmosphere of nitrogen at −15° C. and filtered at −15° C. to remove the crystalline vitamin $D_3$. The vitamin $D_3$ crystals were washed with two 9 ml. portions of purified acetonitrile which had been cooled to −15° C.

and were vacuum dried at room temperature to obtain 5.93 g. of crystalline vitamin $D_3$ (100% pure;

$$E_{1\,cm.}^{1\%} = 481 \text{ at } 265 \text{ m}\mu$$

in isopropyl alcohol).

The following examples, although 100% pure vitamin $D_3$ was used as the starting material, are included to illustrate further alternatives which can be used in carrying out the process with respect to the quantities and nature of the solvents used.

*Example XIV*

3.00 g. of vitamin $D_3$ (100% pure;

$$E_{1\,cm.}^{1\%} = 492.9 \text{ at } 265 \text{ m}\mu$$

in isopropyl alcohol) was dissolved in 3 ml. of purified benzene by gentle heating and 9 ml. of purified acetonitrile added. The solution became cloudy immediately after the acetonitrile addition. The cloudy solution was seeded with vitamin $D_3$ crystals and cooled to 5° C. It was then stored for twelve hours at 5° C. Extensive vitamin $D_3$ crystallization occurred during storage. The mixture was then stored for twenty-four hours at −5° C. and the crystalline vitamin $D_3$ removed by filtration at −15° C. The vitamin $D_3$ crystals were washed with two 9 ml. portions of purified acetonitrile which had been cooled to −15° C. and were vacuum dried at room temperature to obtain 2.57 g. of white crystalline vitamin $D_3$.

*Example XV*

3.00 g. of vitamin $D_3$ crystals (100% pure;

$$E_{1\,cm.}^{1\%} = 492.9 \text{ at } 265 \text{ m}\mu$$

in isopropyl alcohol) was dissolved in 6 ml. of purified benzene at room temperature. 24 ml. of purified acetonitrile was added to the solution. The resulting clear solution was seeded with vitamin $D_3$ crystals, stored for twelve hours at 5° C. and then for twenty-four hours at −5° C. Vitamin $D_3$ crystallization occurred during storage and the crystalline vitamin $D_3$ was removed by filtration at −15° C. The vitamin $D_3$ crystals were washed with two 9 ml. portions of purified acetonitrile which had been cooled to −15° C. and were then vacuum dried at room temperature to obtain 2.45 g. of white crystalline vitamin $D_3$.

What is claimed is:

1. A process for preparing crystalline vitamin $D_3$ comprising
    (A) preparing a solution of a member selected from the group consisting of vitamin $D_3$ and vitamin $D_3$ resin in a solvent selected from the group consisting of aliphatic hydrocarbons, cycloaliphatic hydrocarbons, aromatic hydrocarbons, aliphatic alcohols, aliphatic ketones and mixtures thereof,
    (B) adding an aliphatic nitrile having from two to five carbon atoms to said solution,
    (C) initiating crystallization of vitamin $D_3$ therefrom and allowing said crystallization to proceed, and
    (D) recovering crystalline vitamin $D_3$.

2. A process for preparing crystalline vitamin $D_3$ comprising
    (A) preparing a solution of one part by weight of a member selected from the group consisting of vitamin $D_3$ and vitamin $D_3$ resin in from one to four parts by volume of a solvent selected from the group consisting of aliphatic hydrocarbons, cycloaliphatic hydrocarbons, aromatic hydrocarbons, aliphatic alcohols, aliphatic ketones and mixtures thereof,
    (B) adding from three to twelve parts by volume of an aliphatic nitrile having from two to five carbon atoms to said solution,
    (C) initiating crystallization of vitamin $D_3$ therefrom and allowing said crystallization to proceed, and
    (D) recovering crystalline vitamin $D_3$.

3. The process of claim 2 wherein said nitrile is acetonitrile.

4. A process for preparing crystalline vitamin $D_3$ comprising
    (A) preparing a solution containing one part by weight of vitamin $D_3$ in from one to four parts by volume of benzene,
    (B) adding from three to twelve parts by volume of acetonitrile to said solution,
    (C) initiating crystallization of vitamin $D_3$ therefrom and allowing said crystallization to proceed, and
    (D) recovering crystalline vitamin $D_3$.

5. A process for preparing crystalline vitamin $D_3$ comprising
    (A) preparing a solution containing one part by weight of vitamin $D_3$ resin in from one to four parts by volume of benzene,
    (B) adding from three to twelve parts by volume of acetonitrile to said solution,
    (C) initiating crystallization of vitamin $D_3$ therefrom and allowing said crystallization to proceed, and
    (D) recovering crystalline vitamin $D_3$.

References Cited

UNITED STATES PATENTS 2,528,025   10/1960   Whyte _____ 260—397.2

LEWIS GOTTS, *Primary Examiner.*

ELBERT L. ROBERTS, *Assistant Examiner.*